(12) United States Patent
Yu et al.

(10) Patent No.: US 10,970,628 B2
(45) Date of Patent: Apr. 6, 2021

(54) TRAINING NEURAL NETWORKS REPRESENTED AS COMPUTATIONAL GRAPHS

(71) Applicant: Google LLC, Mountain View, CA (US)

(72) Inventors: Yuan Yu, Cupertino, CA (US); Manjunath Kudlur Venkatakrishna, San Jose, CA (US)

(73) Assignee: Google LLC, Mountain View, CA (US)

( * ) Notice: Subject to any disclaimer, the term of this patent is extended or adjusted under 35 U.S.C. 154(b) by 550 days.

(21) Appl. No.: 15/347,618

(22) Filed: Nov. 9, 2016

(65) Prior Publication Data
US 2017/0132513 A1    May 11, 2017

Related U.S. Application Data

(60) Provisional application No. 62/253,057, filed on Nov. 9, 2015.

(51) Int. Cl.
G06N 3/08 (2006.01)
G06F 9/50 (2006.01)
G06N 3/04 (2006.01)

(52) U.S. Cl.
CPC ............. *G06N 3/08* (2013.01); *G06F 9/5038* (2013.01); *G06F 9/5044* (2013.01);
(Continued)

(58) Field of Classification Search
CPC ...... G06N 3/08; G06N 3/0445; G06N 3/0454; G06N 3/084; G06F 9/5038; G06F 9/5044
See application file for complete search history.

(56) References Cited

U.S. PATENT DOCUMENTS 6,128,606 A    10/2000  Bengio et al.
8,826,255 B1    9/2014  Avadhanula et al.
(Continued)

FOREIGN PATENT DOCUMENTS

WO    1998/40824    9/1998

OTHER PUBLICATIONS

Andreas Griewank, "Who Invented the Reverse Mode of Differentiation?", Documenta Mathematica, The International Symposium on Mathematical Programming (ISMP) Extra vol. 2012, pp. 389-400 (Year: 2012).*
(Continued)

*Primary Examiner* — Miranda M Huang
*Assistant Examiner* — Catherine F Lee
(74) *Attorney, Agent, or Firm* — Fish & Richardson P.C.

(57) ABSTRACT

Systems and Methods for training a neural network represented as a computational graph are disclosed. An example method begins with obtaining data representing a computational graph. The computational graph is then augmented to generate a training computational graph for training the neural network using a machine learning training algorithm that includes computing a gradient of an objective function with respect to each of the parameters of the neural network. Augmenting the computational graph includes inserting a plurality of gradient nodes and training edges into the computational graph to generate a backward path through the computational graph that represents operations for computing the gradients of the objective function with respect to the parameters of the neural network. The neural network is trained using the machine learning training algorithm by executing the training computational graph.

31 Claims, 5 Drawing Sheets

(52) U.S. Cl.
  CPC ......... *G06N 3/0445* (2013.01); *G06N 3/0454* (2013.01); *G06N 3/084* (2013.01)

(56) References Cited

U.S. PATENT DOCUMENTS

| | | | | |
|---|---|---|---|---|
| 9,424,079 | B2* | 8/2016 | Rossbach | G06F 9/4843 |
| 10,282,228 | B2* | 5/2019 | Vermeulen | G06F 9/466 |
| 2015/0007182 | A1 | 1/2015 | Rossbach et al. | |
| 2016/0162781 | A1 | 6/2016 | Lillicrap et al. | |
| 2017/0046614 | A1* | 2/2017 | Golovashkin | G06N 3/082 |
| 2018/0101681 | A1* | 4/2018 | Davis | G06F 21/564 |

OTHER PUBLICATIONS

Griewank, "Who Invented the Reverse Mode of Differentiation?," 2012, Documenta Mathematica ISMP 2012, pp. 389-400 (Year: 2012).*

Dinh, L., et al., "NICE: Non-linear Independent Components Estimation," Apr. 10, 2015, arXiv:1410.8516v6 [cs.LG], pp. 1-13 (Year: 2015).*

Wan et al., "Diagrammatic Methods for Deriving and Relating Temporal Neural Network Algorithms," 1997, Lecture Notes in Computer Science, 36 pages (Year: 1997).*

Murray et al., "Naiad: A Timely Dataflow System," Nov. 2013, SOSP '13, pp. 439-455 (Year: 2013).*

Arvind et al., "Dataflow Architectures," 1986, Annual Review Computer Science, 1:225-53 (Year: 1986).*

Written Opinion in International Application No. PCT/US2016/061151, dated Oct. 5, 2017, 9 pages.

International Search Report and Written Opinion in International Application No. PCT/US2016/061151, dated May 24, 2017, 22 pages.

Abadi et al., "TensorFlow: Large-Scale Machine Learning on Heterogeneous Distributed Systems," (Nov. 9, 2015) (retrieved from http://download.tensorflow.org/paper/whitepaper2015.pdf), 19 pages.

Invitation to Pay Additional Fees and Where Applicable, Protest Fees, in International Application No. PCT/US2016/061151, dated Mar. 29, 2017, 11 pages.

'www.wikipedia.com' [online] "Automatic differentiation," Nov. 4, 2015, [retrieved on Mar. 20, 2017] Retrieved from Internet: URL<https://en/wikipedia.org/w/index.php?title-Automatic_differentiation&oldid=688944133> 15 pages.

Romero et al. "FitNets: hints for thin deep nets," arXiv preprint arXiv1412.6550v4, Mar. 27, 2015, 13 pages.

Bottou et al. "Global Training of Document Processing Systems Using Graph Transformer Networks," Proceedings of the 1997 IEEE Computer Society Conference on Computer Cision and Pattern Recognition, Jun. 17-19, 1997, 6 pages.

Goldberg. "A Primer on Neural Network Models for Natural Language Processing," Journal of Artificial Intelligence Research 57, 2016, 76 pages.

International Preliminary Report on Patentability issued in International Application No. PCT/US2016/061151, dated Jan. 29, 2018, 24 pages.

Wan et al, "Diagrammatic Methods for Deriving and Relating Temporal Neural Network Algorithms" Lecture Notes in Computer Science, 1997, 36 pages.

EP Office Action in European Application No. 16831657.8, dated Feb. 11, 2021, 10 pages.

Mantyjarvi, "Sensor-based context recognition for mobile applications" VTT Publications, 2003, 122 pages.

* cited by examiner

200

```
┌─────────────────────────────────────────────────────────────────────────┐
│ OBTAIN DATA REPRESENTING A COMPUTATIONAL GRAPH COMPRISING A PLURALITY OF │
│                    NODES AND DIRECTED EDGES                              │
│                                                                    202   │
└─────────────────────────────────────────────────────────────────────────┘
                                    │
                                    ▼
┌─────────────────────────────────────────────────────────────────────────┐
│  AUGMENT THE COMPUTATIONAL GRAPH TO GENERATE A TRAINING COMPUTATIONAL    │
│ GRAPH FOR TRAINING THE NEURAL NETWORK USING A MACHINE LEARNING ALGORITHM │
│ THAT INCLUDES COMPUTING A GRADIENT OF AN OBJECTIVE FUNCTION WITH RESPECT │
│           TO EACH PARAMETER OF THE NEURAL NETWORK           204          │
└─────────────────────────────────────────────────────────────────────────┘
                                    │
                                    ▼
┌─────────────────────────────────────────────────────────────────────────┐
│  TRAIN THE NEURAL NETWORK USING THE MACHINE LEARNING TRAINING ALGORITHM BY │
│              EXECUTING THE TRAINING COMPUTATIONAL GRAPH                  │
│                                                                    206   │
└─────────────────────────────────────────────────────────────────────────┘
```

FIG. 2

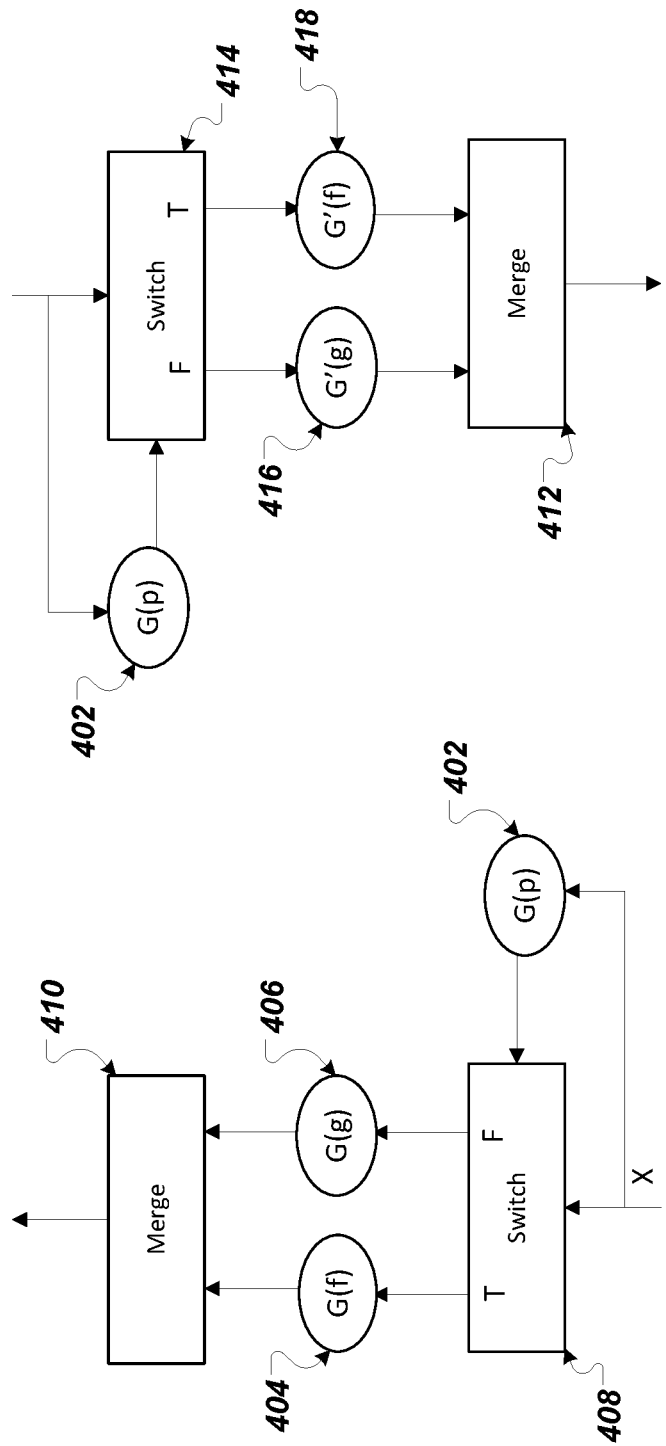

TRAINING NEURAL NETWORKS REPRESENTED AS COMPUTATIONAL GRAPHS

CROSS-REFERENCE TO RELATED APPLICATION

This application claims the benefit under 35 U.S.C. § 119(e) of the filing date of U.S. Patent Application No. 62/253,057, entitled TRAINING NEURAL NETWORKS REPRESENTED AS COMPUTATIONAL GRAPHS, which was filed on Nov. 9, 2015, and which is incorporated here by reference.

BACKGROUND

This specification relates to processing computational graphs representing neural networks.

Neural networks are machine learning models that employ one or more layers of models to generate an output, e.g., one or more classifications, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters for the layer.

In some existing systems, the layers of a neural network are processed by an individual device. The device can have a processor that performs operations, e.g., generating outputs at a layer from inputs, and stores outputs from the operations in memory. Due to the large number and size of operations generally required to generate the outputs in the neural network, one device can take a significant amount of time to process the layers of the neural network.

SUMMARY

This specification describes a system implemented as computer programs on one or more computers in one or more locations that trains a neural network represented by a computational graph.

The computational graph includes nodes, connector directed edges, and parameter directed edges. Each node represents a respective operation performed by the neural network as part of determining a neural network output from a neural network input, each connector directed edge connects a respective first node to a respective second node that represents an operation that receives, as input, an output of an operation represented by the respective first node, and each parameter directed edge connects into a respective node and represents a flow of one or more parameters of the neural network as input to the operation represented by the respective node.

In general, one innovative aspect of the subject matter described in this specification can be embodied in methods that include the actions of obtaining data representing the computational graph; augmenting the computational graph to generate a training computational graph for training the neural network using a machine learning training algorithm that includes computing a gradient of an objective function with respect to each of the parameters of the neural network, comprising: inserting a plurality of gradient nodes and training edges into the computational graph to generate a backward path through the computational graph that represents operations for computing the gradients of the objective function with respect to parameters flowing along a respective parameter directed edge in the computational graph; and training the neural network using the machine learning training algorithm by executing the training computational graph.

The system trains the neural network using the machine learning training algorithm by executing the training computational graph. In particular, the system may, as part of augmenting the computational graph, generate multiple instances of the computational graph that includes the backward path to generate a final training computational graph. The system may then allocate the nodes in the final training computational graph across a plurality of devices; and cause each of the devices to perform the operations represented by the nodes allocated to the device. Processing a computational graph in a distributed manner is described in more detail in U.S. patent application Ser. No. 15/337,744, entitled PROCESSING COMPUTATIONAL GRAPHS, filed on Oct. 28, 2016, and U.S. patent application Ser. No. 15/338,225, entitled MODIFYING COMPUTATIONAL GRAPHS, filed on Oct. 28, 2016, the contents of each which are hereby incorporated by reference herein in their entirety.

Other embodiments of this aspect include corresponding computer systems, apparatus, and computer programs recorded on one or more computer storage devices, each configured to perform the actions of the methods. For a system of one or more computers to be configure to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. As part of augmenting the computational graph, the system may identify one or more control flow nodes in the computational graph. Each control flow node represents a control flow operation that causes operations represented by one or more other nodes in the computational graph to be conditionally or iteratively performed during execution of the computational graph. For each identified control flow node, the system inserts a corresponding backward path control flow node along the backward path through the computational graph. Each backward path control flow node adjusts control flow along the backward path to account for the control flow operation represented by the corresponding control flow node.

For example, the one or more control flow nodes may include a switch control flow node. In this case, the backward path control flow node corresponding to the switch control flow node is a merge backward control flow node.

For example, the one or more control flow nodes may include a merge control flow node. In this case, the backward path control flow node corresponding to the merge control flow node is a switch backward control flow node.

For example, the one or more control flow nodes may include an enter control flow node. In this case, the backward path control flow node corresponding to the enter control flow node is an exit backward control flow node.

For example, the one or more control flow nodes may include an exit control flow node. In this case, the backward path control flow node corresponding to the exit control flow node is an enter backward control flow node.

For example, the one or more control flow nodes may include an iteration counter control flow node. In this case, the backward path control flow node corresponding to the iteration counter control flow node is an iteration counter backward control flow node. Multiple iterations of one or more particular operations represented by one or more particular nodes in the computational graph may be performed during execution of the computational graph. One or more monitoring nodes may be inserted into the computational graph that represent operations, which, during the execution of the training computational graph, monitor a number of iterations of the particular operations that are performed, and for each performed iteration of each of the particular operations, stores the output of the particular operation represented by the node during the iteration. During execution of the backward path in the training computational graph, outputs stored by the one or more monitoring nodes may be provided as input to the gradient functions represented by one or more of the gradient nodes. Determining that multiple iterations of one or more particular operations represented by one or more particular nodes in the computational graph are performed during execution of the computational graph may comprise analyzing the computational graph to identify one or more control flow nodes in the computational graph that cause the particular operations represented by the one or more particular nodes in the computational graph to be performed multiple times. The neural network may be a recurrent neural network that receives a respective neural network input at each of a plurality of time steps and generates a respective neural network at each of the plurality of time steps. The operations represented by each of the particular nodes may generate a respective node output for each of the plurality of time steps, and the monitoring nodes may store the respective node outputs for each of the plurality of time steps. Storing the output of the particular operation represented by the node during the iteration may include asynchronously sending the data from a device on which it was produced to a central processing unit for storage after the data was produced and asynchronously retrieving the data from the center processing unit for use on the device in the backward path through the computational graph that represents operations for computing the gradients of the objective function with respect to the parameters of the neural network. Training the neural network using the machine learning training algorithm by executing the training computational graph may comprise allocating the nodes in the training computational graph across a plurality of devices and causing each of the devices to perform the operations represented by the nodes allocated to the device.

The subject matter described in this specification can be implemented in particular embodiments so as to realize one or more of the following advantages. An example implementation is advantageous because it allows a backward path to be generated from a forward propagation path that includes cyclical control flow constructs. An example system obtains data representing the computational graph and augments the computational graph to generate a training computational graph for training the neural network using a machine learning training algorithm that includes computing a gradient of an objective function, e.g., a cost function or a loss function, with respect to each of the parameters of the neural network, e.g., as in stochastic gradient descent.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for augmenting a computational graph to generate a training computational graph for training a neural network.

FIG. 4A illustrates an example of control flow operations in a forward propagation of a computational graph.

FIG. 4B illustrates an example of control flow operations in a backward propagation of a computational graph that correspond to the control flow operations of the forward propagation illustrated in FIG. 4A.

Like reference numbers and designations in the various drawings indicate like elements.

DETAILED DESCRIPTION

Figure 1A:
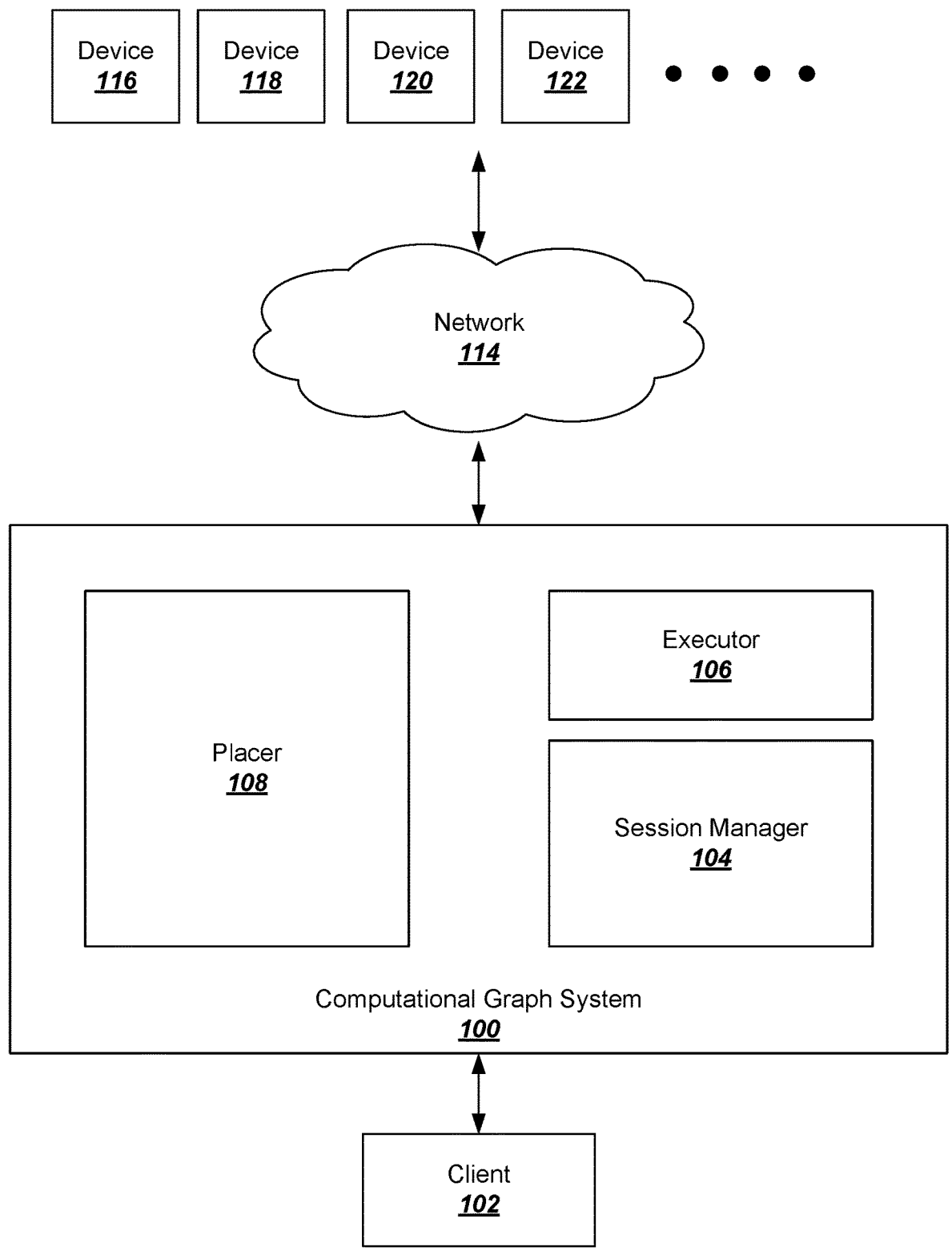
FIG. 1A illustrates an example computational graph system for training neural networks represented as computational graphs.

This specification generally describes a computational graph system that performs operations represented by a computational graph in a distributed manner. Particularly, this specification describes techniques for augmenting a computational graph to generate a training computational graph for training a neural network using a machine learning training algorithm. More particularly, such techniques describe computing a gradient of an objective function with respect to each of the parameters of the neural network when the objective function contains cyclical control flow constructs. An example algorithm uses backward propagation of errors, known as backward propagation, in conjunction with an optimization method to compute these gradients. Backward propagation requires differentiation of an objective function, e.g., a cost function or a loss function, with respect to each of the parameters of a neural network that can be complicated when the objective function contains control flow constructs.

A computational dataflow graph expresses computations of a machine learning model with nodes representing operations and directed edges representing data dependency between operations. An incoming edge to a node represents a flow of an input into the node, i.e., an input argument to the operation represented by the node. If all arguments required for an operation are available to the operation node, the node is enabled and can be executed.

An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

Generally, the input and outputs flowing along directed edges in the computational graph are tensors. A tensor is a multidimensional array of numeric values or other values, e.g., strings, having a specific order that corresponds to the dimensionality of the array. For example, a scalar value is a 0th-order tensor, a vector of numeric values is a 1st-order tensor, and a matrix is a 2nd-order tensor.

In some implementations, the operations represented in the computational graph are neural network operations or operations for a different kind of machine learning model. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the network generate an output from a received input in accordance with current values of a respective set of parameters, while other layers of the network may not have parameters.

For example, the operations represented by the computational graph may be operations necessary for the neural network to compute an inference, i.e., to process an input through the layers of the neural network to generate a neural network output for the input. As another example, the operations represented by the computational graph may be operations necessary to train the neural network by performing a neural network training procedure to adjust the values of the parameters of the neural network, e.g., to determine trained values of parameters from initial values of the parameters. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, this matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., softmax, Sigmoid, rectified linear unit (ReLU), or convolutions.

In an example system, one or more sets of nodes in the computational graph may represent operations that control the dataflow through a computational graph. The one or more sets of nodes may, for instance, represent conditional, recursive, and/or iterative control flow statements including: if statements, while loops, do-while loops, for loops, for-each loops, or nested control flow statements that include a combination of these statements. Such control flow statements may, for example, be represented by a combination of primitive data flow operations.

For example, operations that are referenced in this specification as "Switch," "Merge," "Enter," "Exit," and "Iteration Counter," may be included in a combination to control conditional, recursive, or iterative execution of a computational graph.

A "Switch" operation takes in an input value, d, and forwards the input value to one of its outputs depending on the value of a received control value, p. The control value is a Boolean value that is either true or false at the time the control computation is executed. That is, a switch switches between providing one of two outputs using the value of the control value it receives. A switch operation requires both the input value and the control input value to be present in order to enable the switch for execution.

A "Merge" operation receives input and forwards values in its input to its output. An example merge operation is enabled for execution when the value of any of its inputs is present. Typically, merge is defined to take an additional control input that controls which input to use, similar to the switch operation. However, in an example system, values can be uniquely tagged so that preserving order when merging is unnecessary.

An "Enter" operation represents an entry into a loop or other execution frame that is uniquely identified by a given name. This operation may, for instance, serve to create or find a child frame that is identified by the name. An example system can instantiate a new execution frame during runtime when the first "Enter" operation to the frame is executed. In this context, frames may include instruction templates that are allocated to support execution frames. In some examples, such frames described within this specification may include those which are allocated under any conventional dynamic dataflow machine architecture. An "Enter" operation may be used to pass a data structure, such as a tensor, in one execution frame to a child execution frame. There can be multiple "Enter" operations to the same child execution frame, each making a data structure asynchronously available in the child execution frame. An "Enter" operation is enabled for execution when its input is available.

An "Exit" operation represents an exit from a loop or other execution frame. This operation forwards a value from the execution frame to its parent execution frame. This "Exit" operation is used to return computations in a child execution frame back to its parent frame. The operation may return a data structure, such as a tensor, computed in the child execution. There can be multiple "Exit" operations to a parent frame from a child frame, each asynchronously passing a data structure back to the parent frame. An "Exit" operation is enabled when its input is available.

An "Iteration Counter" operation maintains a counter of the number of iterations of a given loop and increments the counter upon input to the operation. This operation allows different invocations of the same node in a recursive or iterative processes to be uniquely identified.

To train the neural network, the system obtains data representing the computational graph and augments the computational graph to generate a training computational graph for training the neural network using a machine learning training algorithm that includes computing a gradient of an objective function, e.g., a cost function or a loss function, with respect to each of the parameters of the neural network, e.g., as in stochastic gradient descent. In particular, the system augments the computational graph by inserting gradient nodes and training edges into the computational graph to generate a backward path through the computational graph that represents operations for computing the gradients of the objective function with respect to the parameters of the neural network. Each gradient node represents a respective gradient function that computes a gradient of the objective function with respect to parameters flowing along a respective parameter directed edge in the computational graph.

An example system modifies a backpropagation process to handle the cycles created by executing control flow operations. Each control flow operation in the forward propagation path of the computational graph has a corresponding operation in the backward propagation path. For example, a "Switch" operation corresponds to a "Iteration Counter" operation followed by a "Merge" operation, a "Merge" operation corresponds to a "Switch" operation, an "Enter" operation corresponds to an "Exit" operation, an "Exit" operation corresponds to an "Enter" operation, and a "Iteration Counter" stays the same. To handle while loops, the example system automatically rewrites computational graphs containing while loops to record the number of iterations the graph performs and all the "history" tensors that are needed for backward propagation. The number of iterations that the forward propagation performs is used to control the number of iterations that the backward propagation performs.

Representing a neural network as a computational graph provides a flexible and granular way to efficiently implement the neural network, especially if the operations for the neural network are distributed across multiple devices with different hardware profiles.

FIG. 1A illustrates an example computational graph system 100 for augmenting the computational graph to generate a training computational graph for training the neural network using a machine learning training algorithm that includes computing a gradient of an objective function with respect to each of the parameters of the neural network. The system 100 is an example of a system implemented as computer programs on one or more computers in one or more locations, in which the systems, components, and techniques described below can be implemented.

A user of a client 102 can request operations be performed on a computational graph representing a neural network. The client 102 can be an application running on a computer.

As part of the request, the client 102 provides data identifying a computational graph to the system 100 and specifies types of operations to be performed on the computational graph.

For example, the request can identify a computational graph representing an inference for a particular neural network and can identify an input on which the inference should be performed.

As another example, the request can identify a computational graph representing a neural network to be trained and an input, such as training data, on which the training should be performed.

In this example, in response to receiving the request, the system 100 can augment the computational graph to generate a training graph. Augmenting the graph is described in more detail below.

The system 100 performs the operations to generate the particular output by partitioning the operations represented by the computational graph across multiple devices 116-122. The system 100 partitions the operations to the multiple devices 116-122 over a data communication network 114, e.g., local area network (LAN) or wide area network (WAN). The devices 116-122 perform the operations and, if applicable, return a respective output or indication to the system 100, which can return the requested output or indication to the client 102.

Any devices performing neural network operations, e.g., devices 116-122, can include a memory, e.g., a random access memory (RAM), for storing instructions and data and a processor for executing stored instructions. Generally, each device is a hardware resource that performs operations independent of other devices. For example, each device can have its own processing unit. The devices can be graphical processing units (GPUs) central processing units (CPUs), field programmable gate arrays (FPGAs), application specific integrated circuits (ASICs), or neural network specific processors. By way of illustration, one machine can host one or more devices, e.g., multiple CPUs, GPUs, FPGAs, ASICs, or neural network specific processors. Examples of such devices and machines can be seen in FIG. 1B.

Figure 1B:
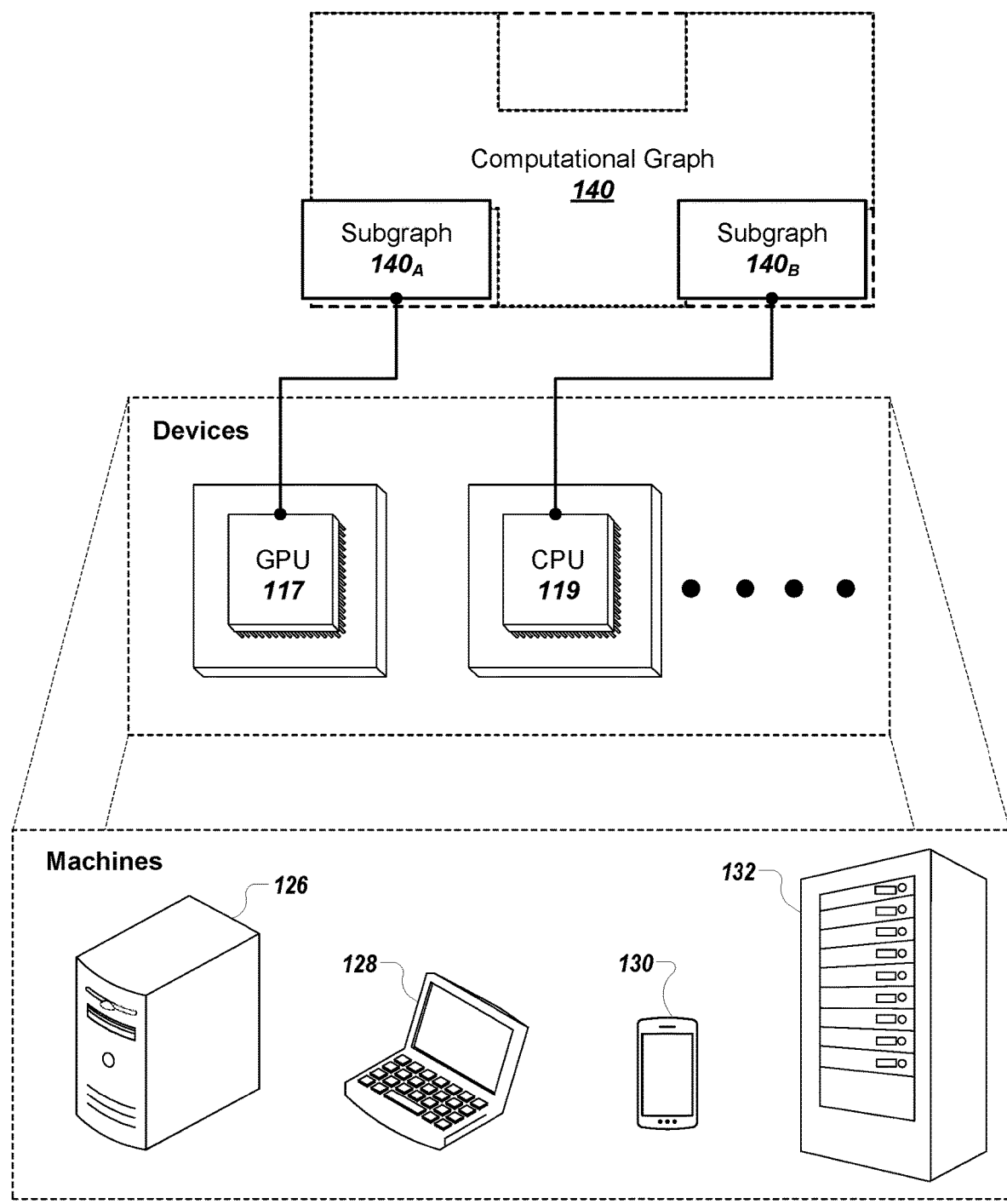
FIG. 1B is a conceptual diagram for an exemplary framework for distributing operations and values for neural networks represented as computational graphs in a system.

FIG. 1B is a conceptual diagram for an exemplary framework for distributing operations for neural networks represented as computational graphs in the system 100. Referring now to FIG. 1B, examples of machines may include a computing device 126, personal computer 128, mobile device 130, and server 132. Each machine may, for example, include one or more devices, such as GPU 117 and CPU 119, or FPGAs, ASICs, and neural network specific processors.

Each device can also have a respective computational capability. That is, devices can have different amount of memories, processing speed, or other architectural characteristics. Thus, some devices can perform operations that other devices cannot. For example, some operations require a certain amount of memory that only particular devices have, or some devices are configured to only perform a particular type of operation, e.g., inference operations.

Referring again to FIG. 1A, a session manager 104 in the system 100 may receive a request from the client 102 to start a session during which operations of the computational graph are performed. The session manager 104 manages the set of devices, e.g., devices 116-122, that can perform operations of the computational graph, and can provide a placer 108 with the set of devices that are available to perform operations.

The placer 108 determines, for each operation to be performed in the computational graph, a respective target device, e.g., device 116, that performs the operation, and in some implementations, a time for the respective target device to perform the operation. Some operations can be performed in parallel while other operations require prior operations in the computational graph to be completed, e.g., the other operations process, as inputs, outputs of the prior operations.

After the devices perform the operations allocated by the placer 108 to generate outputs, the executor 106 can retrieve the outputs. The executor 106 can generate an appropriate response to the request, e.g., an output or an indication that the processing has been completed. Then, the executor 106 can return the response to the client 102.

The session manager 104 also provides sets of operations to be performed in the computational graph to the executor 106. The executor 106 periodically retrieves runtime statistics from the devices 116-122 related to graph execution of operations. The executor 106 provides the runtime statistics to the placer 108, which can re-optimize placement and scheduling of further operations.

In operation, the system 100 may receive a request from a client 102 to process a computational graph. For example, the request can be a request to perform a neural network inference represented by the computational graph on a specified input, a request to perform neural network training operations represented by the computational graph on a specified set of training data, or a request to perform other neural network operations represented by the computational graph, as described above.

Upon receipt of the request, the system 100 may obtain data representing the computational graph. In some cases, the data is sent with the request from the client. In other cases, the request identifies the computational graph and the system 100 retrieves the data representing the identified graph from memory. By way of illustration, the data representing the graph can be an array of the nodes in the graph. Each node can contain information specifying an operation type, a name, and a list of incoming and outgoing edges to the node.

The system 100 may then augment the computational graph with nodes and edges to generate a backward propagation that includes operations for the neural network to generate a gradient output for the input.

The system 100 may identify multiple available devices for performing the requested operation. A device may be considered busy if the device is currently performing other operations and cannot be assigned further operations or is otherwise unavailable to perform graph processing operations. The device may be considered available if the device can be assigned further operations, e.g., the further operations can be queued for operation by the device.

The system 100 may partition the computational graph into multiple subgraphs. Each subgraph includes one or more nodes in the computational graph. The system 100 may, in some examples, obtain these subgraphs by breaking up pairs of nodes in the computational graph that are adjacent to each other, but are assigned to different devices.

The system 100 may assign, for each subgraph, the operations represented by the one or more nodes in the subgraph to a respective available device. In some implementations, the system 100 may assign each subgraph to a device having a computational capability necessary to perform the operations represented by the nodes in the subgraph. In some implementations, the request from the client includes data specified by a user that identifies a particular type of device to perform operations for particular nodes.

Thus, the system 100 generates an allocation of the computational graph across multiple devices that assigns each node in the computational graph to a respective device of the multiple devices. Each subgraph includes a given group of one or more nodes in the computational graph which, as described above, may be assigned to the same device. An exemplary subgraph to device mapping can be seen in FIG. 1B. In this example, exemplary subgraphs 140A and 140B of computational graph 140 may be allocated to GPU 116 and CPU 118, respectively. GPU 116 and CPU 118 may reside in a different or a same one of machines 126-132. In operation, GPU 116 and CPU 118 may perform the operations represented by the nodes included in the subgraph that the system 100 has assigned to them. As described above, computational graphs may also be allocated to FPGAs, ASICs, or neural network specific processors.

The system 100 may cause the devices to perform the operations of the nodes included in the subgraphs respectively assigned to the devices. In some implementations, the system 100 may send each device a request to start the operations of the nodes included in the subgraph assigned to the respective device. In response to receiving such a request from the system 100, each device may proceed to perform the operations of the nodes included in the subgraph assigned to the device.

FIG. 2 is a flow diagram of an example process 200 for augmenting a computational graph to generate a training computational graph for training a neural network. For convenience, the process 200 will be described as being performed by a system of one or more computers, located in one or more locations, and programmed appropriately in accordance with this specification. For example, an example computational graph system 100 of FIG. 1A, appropriately programmed, can perform the process 200.

The system obtains data representing a computational graph comprising nodes and directed edges (202).

The system augments the computational graph to generate a training computational graph for training the neural network using a machine learning algorithm that includes computing a gradient of an objective function with respect to each parameter of the neural network (204).

To augment the computational graph, the system inserts a plurality of gradient nodes and training edges into the computational graph to generate a backward path through the computational graph that represents operations for computing the gradients of the objective function with respect to the parameters of the neural network. Each gradient node represents a gradient function that computes a gradient of the objective function with respect to parameters flowing along a respective parameter directed edge in the computational graph.

In particular, the system augments the graph by inserting operations in a backward propagation path that are differentiated operations corresponding to the operations in the forward propagation path. The system begins a backward propagation path with the last operation node in the forward path. The system then adds the differentiated operations of the forward propagation path in reverse order to the backward propagation path until the system reaches the first node of the forward propagation path. For example, if a forward propagation path includes operations A, B, and C, the backward propagation will include C', B', and finally A'.

As part of augmenting the computational graph, the system 100 may identify one or more control flow nodes in the computational graph. Each control flow node represents a control flow operation that causes operations represented by one or more other nodes in the computational graph to be conditionally or iteratively performed during execution of the computational graph. For each identified control flow node, the system 100 inserts a corresponding backward path control flow node along the backward path through the computational graph. As described above, the backward path control flow node is the differentiation of the corresponding forward path control flow node. Each control flow operation in the forward propagation path of the computational graph has a corresponding operation in the backward propagation path. If the example system encounters a "Switch" operation in the forward propagation of the computational graph, the system inserts a corresponding "Merge" operation in the backward propagation. If the system encounters a "Merge" operation, the system inserts a corresponding "Switch" operation in the backward path. The system inserts "Exit" operations when it finds "Enter" operations in the forward propagation path and "Enter" operations" when it finds "Exit" operations in the forward propagation path. When the system encounters an "Iteration Counter" operation, the system just inserts an "Iteration Counter" operation in the backward propagation path.

Each backward path control flow node adjusts control flow along the backward path to account for the control flow operation represented by the corresponding control flow node.

The system then trains the neural network using the machine learning training algorithm by executing the training computational graph (206).

Figure 3:
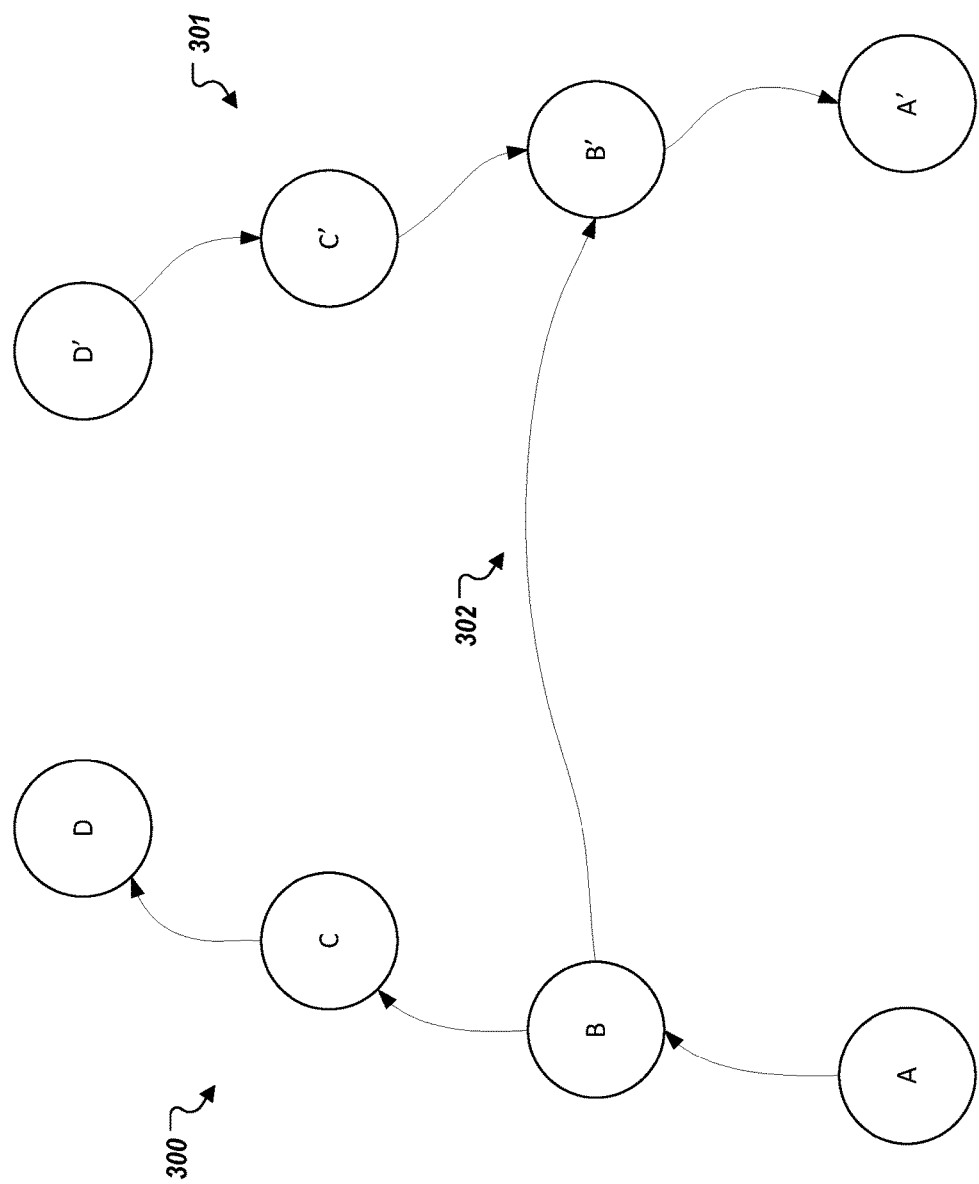
FIG. 3 illustrates an example computational graph that includes forward and backward propagation paths.

FIG. 3 illustrates an example computational graph that includes a forward propagation path 300 and backward propagation path 301. As described, computation of a neural network is expressed as a data flow graph. An example system generates a forward propagation path 300 that includes the operations necessary for the neural network to compute an inference, i.e., to process an input through the layers of the neural network to generate a neural network output for the input. An example system then augments the computational graph with a backward propagation path 301 that includes the operations necessary for the neural network to generate a gradient output for the input. The output of the backward propagation is a gradient of an objective function, e.g., a cost function or a loss function, with respect to each of the parameters of the neural network. To generate a backward propagation 301 from the forward propagation 300, an example system automatically differentiates each node in the forward propagation of the computational graph, A-D.

In some instances, an operation in the backward propagation requires a value from the corresponding forward operation in order to execute. For example, an operation in the forward propagation, B, may compute the square of a number such as $x^2$, where x is a number to be squared. The differentiation of this operation is a 2×operation, which is added to the back propagation operations as B'. In order to compute the value of 2x, the number x should be given to B' in the backward propagation. FIG. 3 illustrates providing an edge 302 between B and B' that sends the value needed from the forward propagation to the backward propagation.

FIG. 4A illustrates an example of control flow operations in a forward propagation of a computational graph. This example represents the conditional computation: if p(x) then f (x) else g(x). In this example, G(p) 402, G(f) 404, and G(g) 406 denote graphs for p, f, and g, respectively. P(x) is the control computation that results in either a true or false output at the time of execution.

The conditional computation is represented in the computational dataflow graph by a "Switch" operation 408 and a "Merge" operation 410. The conditional computation first calculates the value of a control computation, G(p) 402. The value of the control computation is input into the "Switch" operation 408 along with an input value. If the value of the control computation is true, the "Switch" operation 408 sends its input value to its output corresponding to the true value. If the value of the control computation is false, the "Switch" operation 408 sends its input value to its output corresponding to the false value. The example computational dataflow graph enables the subgraph, G(f) 404, or G(g) 406 depending on where the output of the "Switch" operation 408 is located, either the output representing the true branch or the output representing the false branch. The enabled operation is performed and merged by the "Merge" operation 410. The "Merge" operation 410 is essentially a placeholder for naming the output of a conditional.

FIG. 4B illustrates an example of control flow operations in a backward propagation of a computational graph that correspond to the control flow operations of the forward propagation illustrated in FIG. 4A. As illustrated, when the example system encounters a "Switch" operation in the forward propagation 408, the system adds the corresponding operation to the backward propagation. In this case, a "Switch" operation 408 corresponds to a "Merge" operation 412, which is then added to the backward propagation. When the system encounters a "Merge" operation 410 in the forward propagation, the system adds the corresponding operation, a "Switch" operation 414 to the backward propagation. The system also adds the differentiation operations for all operations in the forward propagation path. For example, in addition to inserting a "Merge" operation 412 corresponding to the "Switch" operation 408 of the forward propagation path and a "Switch" operation 414 corresponding to the "Merge" operation 410, the system also inserts differentiation operations corresponding to every operation in the forward propagation path. In this example, the system inserts, into the backward propagation path G'(g) 416 corresponding to G(g) 406, and G' (f) 418 corresponding to G(f) 404. However, the system uses the same Boolean-value, control computation, G(p) 402 in the backward propagation path as the forward.

In some implementations, as part of augmenting the computational graph, the system determines that multiple iterations of one or more particular operations represented by one or more particular nodes in the computational graph are performed during execution of the computational graph.

In particular, the system can analyze the computational graph to identify one or more control flow nodes in the computational graph that cause the particular operations represented by the one or more particular nodes in the computational graph to be performed multiple times. For example, the neural network may be a recurrent neural network that receives a respective neural network input at each of multiple time steps and generates a respective neural network at each of the multiple time steps.

The system then inserts one or more monitoring nodes into the computational graph. The monitoring nodes represent operations that, during the execution of the training computational graph, monitor a number of iterations of the particular operations that are performed, and for each performed iteration of each of the particular operations, stores the output of the particular operation represented by the node during the iteration for use in the gradient computations during the backward path. For example, where the neural network is a recurrent neural network, the operations represented by each of the particular nodes generate a respective node output for each of the time steps, and the monitoring nodes store the respective node outputs for each of the time steps, i.e., so that the outputs of the operations of the particular nodes for all of the time steps are available when the backward pass begins after the neural network output for the last time step is computed. In other words, to reuse forward values in the backward propagation path, the example system detects, during the construction of the backpropagation path, the forward values that are needed in the backpropagation. For each forward value, the system introduces a stack and adds nodes, such as "Iteration Counter" operations, in the forward propagation path to save the forward values at each iteration to the stack. The backpropagation path uses these values from the stack in reverse order.

These respective nodes outputs may be produced on a device, such as a GPU, with limited memory. Storing respective node outputs for each time step may lead to numerous values being stored on a stack, reducing the amount of device memory available for other things. Furthermore, old values are stored the longest since backpropagation uses values in reverse order of the forward propagation. In order to preserve memory on a device, an example system may swap memory from the device to another device, such as a CPU. This swapping may be asynchronous with the system sending a value from the device to the CPU sometime after the value is produced and the system retrieving the value back into the device sometime before it is needed. The system obtains values as they are needed based on the operational order and control defined in the dataflow graph.

Generated computational graphs representing forward and backward propagation paths can be allocated to multiple devices for processing in numerous ways including allocation detailed in U.S. patent application Ser. No. 15/337,744, entitled PROCESSING COMPUTATIONAL GRAPHS, which was filed on Oct. 28, 2016, and which is incorporated here by reference.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a neural network represented as a computational graph, wherein the computational graph comprises a plurality of nodes, a plurality of connector directed edges, and a plurality of parameter directed edges, wherein each node represents a respective operation performed by the neural network as part of determining a neural network output from a neural network input, wherein each connector directed edge connects a respective first node to a respective second node that represents an operation that receives, as input, an output of an operation represented by the respective first node, and wherein each parameter directed edge connects into a respective node and represents a flow of one or more parameters of the neural network as input to the operation represented by the respective node, the method comprising:

obtaining data representing the computational graph;

augmenting the computational graph to generate a training computational graph for training the neural network using a machine learning training algorithm that includes computing a gradient of an objective function with respect to each of the parameters of the neural network, comprising:

identifying one or more control flow nodes in the computational graph, wherein each control flow node represents a control flow operation that causes operations represented by one or more other nodes in the computational graph to be conditionally or iteratively performed during execution of the computational graph, wherein the one or more control flow nodes comprise (i) an enter control flow node representing an enter operation and (ii) a switch control flow node representing a switch operation, inserting a plurality of gradient nodes and training edges into the computational graph to generate a backward path through which gradient data flows, the backward path representing operations for computing the gradients of the objective function with respect to the parameters of the neural network, wherein each gradient node represents a gradient function that computes a gradient of the objective function with respect to parameters flowing along a respective parameter directed edge in the computational graph, inserting, for each identified control flow node, a corresponding backward path control flow node along the backward path through the computational graph, the corresponding backward path control flow node representing an operation for adjusting how the gradient data flows through the gradient nodes along the backward path to account for a respective operation represented by the identified control flow node, wherein a corresponding backward path control flow node for the enter control flow node is an exit control flow node representing an exit operation, wherein a corresponding backward path control flow node for the switch control flow node is a merge backward control flow node representing a merge operation along the backward path; and training the neural network using the machine learning training algorithm by executing the training computational graph.

2. The method of claim 1, wherein the one or more control flow nodes include a merge control flow node representing a merge operation, and wherein a backward path control flow node corresponding to the merge control flow node is a switch backward control flow node representing a switch operation along the backward path.

3. The method of claim 1, wherein the one or more control flow nodes include an exit control flow node representing an exit operation, and wherein a backward path control flow node corresponding to the exit control flow node is an enter backward control flow node representing an enter operation along the backward path.

4. The method of claim 1, wherein the one or more control flow nodes include an iteration counter control flow node representing an iteration counter operation, and wherein a backward path control flow node corresponding to the iteration counter control flow node is an iteration counter backward control flow node representing an iteration counter operation along the backward path.

5. The method of claim 1, wherein augmenting the computational graph further comprises:
   determining that multiple iterations of one or more particular operations represented by one or more particular nodes in the computational graph are performed during execution of the computational graph; and
   inserting one or more monitoring nodes into the computational graph, the monitoring nodes representing operations that, during the execution of the training computational graph, monitor a number of iterations of the particular operations that are performed, and for each performed iteration of each of the particular operations, store the output of the particular operation represented by the node during the iteration.

6. The method of claim 5, wherein, during execution of the backward path in the training computational graph, the outputs stored by the one or more monitoring nodes are provided as input to the gradient functions represented by one or more of the gradient nodes.

7. The method of claim 5, wherein determining that multiple iterations of one or more particular operations represented by one or more particular nodes in the computational graph are performed during execution of the computational graph comprises:
   analyzing the computational graph to identify one or more control flow nodes in the computational graph that cause the particular operations represented by the one or more particular nodes in the computational graph to be performed multiple times.

8. The method of claim 5, wherein the neural network is a recurrent neural network that receives a respective neural network input at each of a plurality of time steps and generates a respective neural network at each of the plurality of time steps, wherein the operations represented by each of the particular nodes generate a respective node output for each of the plurality of time steps, and wherein the monitoring nodes store the respective node outputs for each of the plurality of time steps.

9. The method of claim 5, wherein storing the output of the particular operation represented by the node during the iteration includes:
   asynchronously sending the data from a device on which it was produced to a central processing unit for storage after the data was produced; and
   asynchronously retrieving the data from the central processing unit for use on the device in the backward path through the computational graph that represents operations for computing the gradients of the objective function with respect to the parameters of the neural network.

10. The method of claim 1, wherein training the neural network using the machine learning training algorithm by executing the training computational graph comprises:
    allocating the nodes in the training computational graph across a plurality of devices; and
    causing each of the devices to perform the operations represented by the nodes allocated to the device.

11. A system for training a neural network represented as a computational graph, wherein the computational graph comprises a plurality of nodes, a plurality of connector directed edges, and a plurality of parameter directed edges, wherein each node represents a respective operation performed by the neural network as part of determining a neural network output from a neural network input, wherein each connector directed edge connects a respective first node to a respective second node that represents an operation that receives, as input, an output of an operation represented by the respective first node, and wherein each parameter directed edge connects into a respective node and represents a flow of one or more parameters of the neural network as input to the operation represented by the respective node, the system comprising:
   one or more computers; and
   one or more storage devices storing instructions that are operable, when executed by the one or more computers, to cause the one or more computers to perform operations comprising:
     obtaining data representing the computational graph;
     augmenting the computational graph to generate a training computational graph for training the neural network using a machine learning training algorithm that includes computing a gradient of an objective function with respect to each of the parameters of the neural network, comprising:
       identifying one or more control flow nodes in the computational graph, wherein each control flow node represents a control flow operation that causes operations represented by one or more other nodes in the computational graph to be conditionally or iteratively performed during execution of the computational graph, wherein the one or more control flow nodes comprise (i) an enter control flow node representing an enter operation and (ii) a switch control flow node representing a switch operation,
       inserting a plurality of gradient nodes and training edges into the computational graph to generate a backward path through which gradient data flows, the backward path representing operations for computing the gradients of the objective function with respect to the parameters of the neural network, wherein each gradient node represents a gradient function that computes a gradient of the objective function with respect to parameters flowing along a respective parameter directed edge in the computational graph,
       inserting, for each identified control flow node, a corresponding backward path control flow node along the backward path through the computational graph, the corresponding backward path control flow node representing an operation for adjusting how the gradient data flows through the gradient nodes along the backward path to account for a respective operation represented by the identified control flow node, wherein a corresponding backward path control flow node for the enter control flow node is an exit control flow node representing an exit operation, wherein a corresponding backward path control flow node for the switch control flow node is a merge backward control flow node representing a merge operation along the backward path; and training the neural network using the machine learning training algorithm by executing the training computational graph.

12. The system of claim 11, wherein the one or more control flow nodes include a merge control flow node representing a merge operation, and wherein a backward path control flow node corresponding to the merge control flow node is a switch backward control flow node representing a switch operation along the backward path.

13. The system of claim 11, wherein the one or more control flow nodes include an exit control flow node representing an exit operation, and wherein a backward path control flow node corresponding to the exit control flow node is an enter backward control flow node representing an enter operation along the backward path.

14. The system of claim 11, wherein the one or more control flow includes an iteration counter control flow node representing an iteration counter operation, and wherein a backward path control flow node corresponding to the iteration counter control flow nodes is an iteration counter backward control flow node representing an iteration counter operation along the backward path.

15. The system of claim 11, wherein augmenting the computational graph further comprises:
determining that multiple iterations of one or more particular operations represented by one or more particular nodes in the computational graph are performed during execution of the computational graph; and
inserting one or more monitoring nodes into the computational graph, the monitoring nodes representing operations that, during the execution of the training computational graph, monitor a number of iterations of the particular operations that are performed, and for each performed iteration of each of the particular operations, store the output of the particular operation represented by the node during the iteration.

16. The system of claim 15, wherein, during execution of the backward path in the training computational graph, the outputs stored by the one or more monitoring nodes are provided as input to the gradient functions represented by one or more of the gradient nodes.

17. The system of claim 15, wherein determining that multiple iterations of one or more particular operations represented by one or more particular nodes in the computational graph are performed during execution of the computational graph comprises:
analyzing the computational graph to identify one or more control flow nodes in the computational graph that cause the particular operations represented by the one or more particular nodes in the computational graph to be performed multiple times.

18. The system of claim 15, wherein the neural network is a recurrent neural network that receives a respective neural network input at each of a plurality of time steps and generates a respective neural network at each of the plurality of time steps, wherein the operations represented by each of the particular nodes generate a respective node output for each of the plurality of time steps, and wherein the monitoring nodes store the respective node outputs for each of the plurality of time steps.

19. The system of claim 15, wherein storing the output of the particular operation represented by the node during the iteration includes:
asynchronously sending the data from a device on which it was produced to a central processing unit for storage after the data was produced; and asynchronously retrieving the data from the central processing unit for use on the device in the backward path through the computational graph that represents operations for computing the gradients of the objective function with respect to the parameters of the neural network.

20. The system of claim 11, wherein training the neural network using the machine learning training algorithm by executing the training computational graph comprises:
allocating the nodes in the training computational graph across a plurality of devices; and
causing each of the devices to perform the operations represented by the nodes allocated to the device.

21. A method for training a neural network represented as a computational graph, wherein the computational graph comprises a plurality of nodes, a plurality of connector directed edges, and a plurality of parameter directed edges, wherein each node represents a respective operation performed by the neural network as part of determining a neural network output from a neural network input, wherein each connector directed edge connects a respective first node to a respective second node that represents an operation that receives, as input, an output of an operation represented by the respective first node, and wherein each parameter directed edge connects into a respective node and represents a flow of one or more parameters of the neural network as input to the operation represented by the respective node, the method comprising:
obtaining data representing the computational graph;
augmenting the computational graph to generate a training computational graph for training the neural network using a machine learning training algorithm that includes computing a gradient of an objective function with respect to each of the parameters of the neural network, comprising:
identifying one or more control flow nodes in the computational graph, wherein each control flow node represents a control flow operation that causes operations represented by one or more other nodes in the computational graph to be conditionally or iteratively performed during execution of the computational graph, wherein the one or more control flow nodes comprise a switch control flow node representing a switch operation, inserting a plurality of gradient nodes and training edges into the computational graph to generate a backward path through which gradient data flows, the backward path representing operations for computing the gradients of the objective function with respect to the parameters of the neural network, wherein each gradient node represents a gradient function that computes a gradient of the objective function with respect to parameters flowing along a respective parameter directed edge in the computational graph,
inserting, for each identified control flow node, a corresponding backward path control flow node along the backward path through the computational graph, the corresponding backward path control flow node representing an operation for adjusting how the gradient data flows through the gradient nodes along the backward path to account for a respective operation represented by the identified control flow node, wherein a corresponding backward path control flow node for the switch control flow node is a merge backward control flow node representing a merge operation along the backward path; and training the neural network using the machine learning training algorithm by executing the training computational graph.

22. The method of claim 21, wherein the one or more control flow nodes include a merge control flow node representing a merge operation, and wherein a backward path control flow node corresponding to the merge control flow node is a switch backward control flow node representing a switch operation along the backward path.

23. The method of claim 21, wherein the one or more control flow nodes include an enter control flow node representing an enter operation, and wherein a backward path control flow node corresponding to the enter control flow node is an exit backward control flow node representing an exit operation along the backward path.

24. The method of claim 21, wherein the one or more control flow nodes include an exit control flow node representing an exit operation, and wherein a backward path control flow node corresponding to the exit control flow node is an enter backward control flow node representing an enter operation along the backward path.

25. The method of claim 21, wherein the one or more control flow nodes include an iteration counter control flow node representing an iteration counter operation, and wherein a backward path control flow node corresponding to the iteration counter control flow node is an iteration counter backward control flow node representing an iteration counter operation along the backward path.

26. The method of claim 21, wherein augmenting the computational graph further comprises:
    determining that multiple iterations of one or more particular operations represented by one or more particular nodes in the computational graph are performed during execution of the computational graph; and
    inserting one or more monitoring nodes into the computational graph, the monitoring nodes representing operations that, during the execution of the training computational graph, monitor a number of iterations of the particular operations that are performed, and for each performed iteration of each of the particular operations, store the output of the particular operation represented by the node during the iteration.

27. The method of claim 26, wherein, during execution of the backward path in the training computational graph, the outputs stored by the one or more monitoring nodes are provided as input to the gradient functions represented by one or more of the gradient nodes.

28. The method of claim 26, wherein determining that multiple iterations of one or more particular operations represented by one or more particular nodes in the computational graph are performed during execution of the computational graph comprises:
    analyzing the computational graph to identify one or more control flow nodes in the computational graph that cause the particular operations represented by the one or more particular nodes in the computational graph to be performed multiple times.

29. The method of claim 26, wherein the neural network is a recurrent neural network that receives a respective neural network input at each of a plurality of time steps and generates a respective neural network at each of the plurality of time steps, wherein the operations represented by each of the particular nodes generate a respective node output for each of the plurality of time steps, and wherein the monitoring nodes store the respective node outputs for each of the plurality of time steps.

30. The method of claim 26, wherein storing the output of the particular operation represented by the node during the iteration includes:
    asynchronously sending the data from a device on which it was produced to a central processing unit for storage after the data was produced; and
    asynchronously retrieving the data from the central processing unit for use on the device in the backward path through the computational graph that represents operations for computing the gradients of the objective function with respect to the parameters of the neural network.

31. The method of claim 21, wherein training the neural network using the machine learning training algorithm by executing the training computational graph comprises:
    allocating the nodes in the training computational graph across a plurality of devices; and
    causing each of the devices to perform the operations represented by the nodes allocated to the device.

* * * * *